W. E. BOCK.
VEHICLE SPRING SUSPENSION.
APPLICATION FILED JULY 26, 1918.
1,361,002.
Patented Dec. 7, 1920.
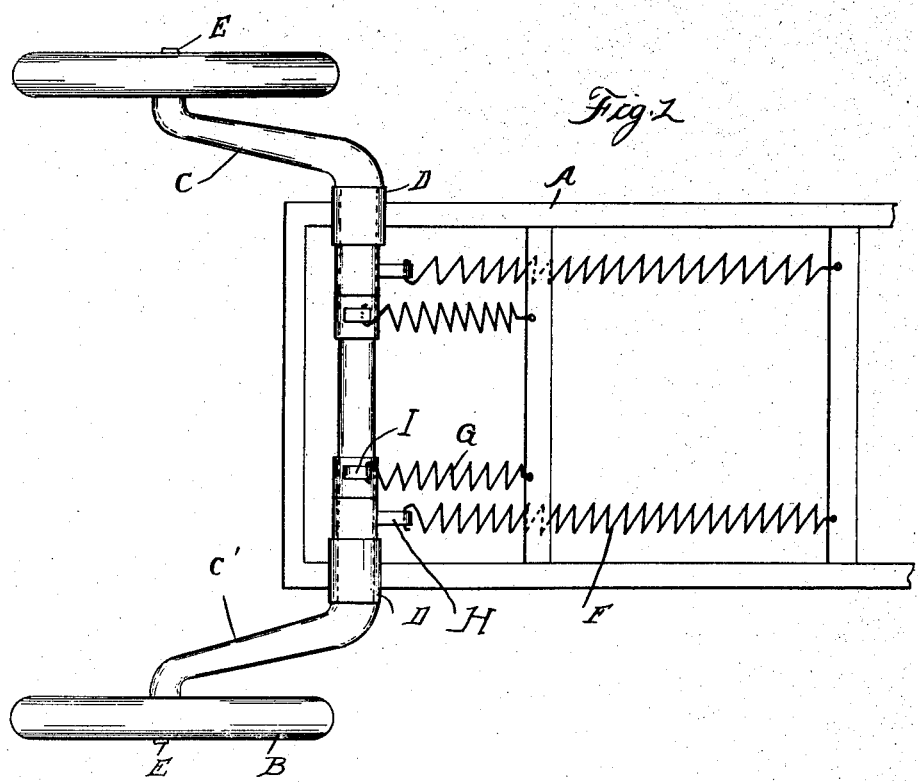
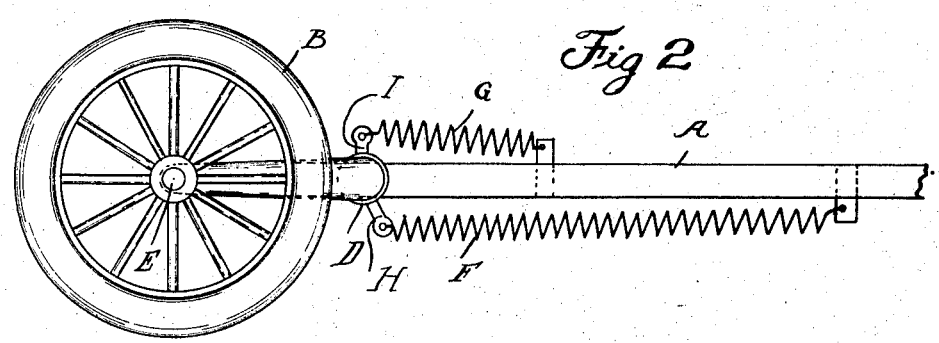
Inventor
William E. Bock
By Whittemore Hulbert & Whittemore
Attorneys

UNITED STATES PATENT OFFICE.

WILLIAM E. BOCK, OF TOLEDO, OHIO.

VEHICLE SPRING SUSPENSION.

1,361,002.

Specification of Letters Patent.

Patented Dec. 7, 1920.

Application filed July 26, 1918. Serial No. 246,823.

*To all whom it may concern:*

Be it known that I, WILLIAM E. BOCK, a citizen of the United States of America, residing at Toledo, in the county of Lucas and State of Ohio, have invented certain new and useful Improvements in Vehicle Spring Suspensions, of which the following is a specification, reference being had therein to the accompanying drawings.

The invention relates to vehicles of that type in which the frame is supported upon the wheels through the medium of independent rock arms. It is the object of the present invention to combine with a highly resilient support stabilizing means for returning the parts to normal position after shocks, and also opposing excessive recoil. To this end the invention comprises the combination with the rocker supports of oppositely-acting resilient means having different ratios of increase in tension, as more fully hereinafter set forth.

In the drawings,—

Figure 1 is a diagrammatic plan view of a vehicle embodying my invention; and

Fig. 2 is a side elevation thereof.

A is the vehicle frame, B are the wheels, and C C' are rocker arms pivotally secured in bearings D upon the frame and provided at their free ends with stub axles E for the wheels. F is a spring operating upon the rocker arm to hold the same in a position for sustaining the frame and load, and G is a spring acting oppositely upon said rocker arm and partially counteracting the force of the spring F. As shown, the spring F is arranged to extend longitudinally of the vehicle frame and is connected to a down-turned bell-crank arm H, while the spring G is connected to an upturned bell-crank arm I. Thus, the spring F tends to actuate the rocker arm so as to depress its free end, thereby raising the frame A; while the spring G, through opposing the spring F, limits the movement of said arm. Normally the parts stand in a position where the load of the vehicle frame, together with the force of the spring G, balances the tension of the spring F; and any shock tending to displace the wheel will move the rocker against the tension of one or the other of these springs. The ratios of increase in tension of these springs with respect to the movement of the rocker are, however, different—spring F permitting a gradual increase, while the spring G mounts in tension much more rapidly. Thus, a considerable displacement of the wheel in an upward direction is permitted by the spring F, while the recoil beyond the neutral point is opposed by the rapid increase in tension of the spring G.

The effect of this construction is to hold the rockers in a normal position which is unaffected by slight changes in load and therefore imparts stability to the vehicle. The spring G is, in effect, a resilient stop, which while yielding under severe shocks permits only a slight recoil of the rocker arm beyond the neutral point.

What I claim as my invention is—

1. In a vehicle, the combination with the frame and ground wheels, of rocker arms forming supports for said frame upon said wheels, and opposed resilient means for resisting movement of each of said rocker arms from its normal position, having different ratios of increase in tension to the movement of said arm.

2. In a vehicle, the combination with a frame and supporting wheels therefor, of rocker arms upon said frame connected to said wheels, resilient means for actuating each of said rocker arms in the direction to resist the load on said frame, and opposed resilient means for holding each of said rocker arms in normal position against the tension of said first-mentioned resilient means and yieldably resisting recoil beyond said neutral position, said opposed resilient means having a different ratio of increase in tension with respect to the movement of the rocker arms than said first mentioned resilient means.

3. In a vehicle, the combination with the frame, of a wheel for supporting the same, a rocker arm pivotally connected to said frame and supported at its free end upon said wheel, a bell-crank arm for said rocker arm, a spring connected to said bell-crank arm and anchored to said frame, being arranged to resist the movement of said arm under a load upon said frame, an oppositely extending bell-crank arm, and a spring connected thereto to oppose said first-mentioned spring and having a ratio of increase in tension with respect to movement of said arm in excess of that of the other spring.

In testimony whereof I affix my signature in presence of two witnesses.

WILLIAM E. BOCK.

Witnesses:
GEO. BREULEY,
LAURA HAWLEY.